United States Patent [19]

Hannerz

[11] Patent Number: 4,526,742

[45] Date of Patent: Jul. 2, 1985

[54] NUCLEAR REACTOR PLANT

[75] Inventor: Kåre Hannerz, Västerås, Sweden

[73] Assignee: AB Asea-Atom, Västerås, Sweden

[21] Appl. No.: 361,641

[22] Filed: Mar. 25, 1982

[30] Foreign Application Priority Data

Mar. 30, 1981 [SE] Sweden ................................ 8102000

[51] Int. Cl.³ .............................................. G21C 9/00
[52] U.S. Cl. .................... 376/282; 376/328;
376/366; 376/289; 376/298; 376/404; 376/406;
376/407; 376/247
[58] Field of Search ............................... 376/402–407,
376/282, 298, 299, 352, 366, 372, 373, 328, 289,
376/247

[56] References Cited

U.S. PATENT DOCUMENTS

| 3,120,471 | 2/1964 | Koutz et al. | 376/404 |
| 3,383,288 | 5/1968 | Deighton | 376/407 |
| 3,393,127 | 7/1968 | Detman et al. | 376/403 X |
| 3,766,007 | 10/1973 | Rolstad et al. | 376/403 X |
| 3,993,539 | 11/1976 | Atherton et al. | 376/246 |
| 4,020,693 | 5/1977 | Ahlgren et al. | 376/245 X |
| 4,033,814 | 7/1977 | Bregeon et al. | 376/404 X |
| 4,210,614 | 7/1980 | Kleimola | 376/407 X |
| 4,319,958 | 3/1982 | Fica et al. | 376/247 |
| 4,363,780 | 12/1982 | Hannerz | 376/282 |
| 4,367,194 | 1/1983 | Schenewerk et al. | 376/298 X |

FOREIGN PATENT DOCUMENTS

1070860  1/1980  Canada ................................. 376/406
1421826  1/1976  United Kingdom .

Primary Examiner—Harold J. Tudor
Assistant Examiner—Daniel Wasil
Attorney, Agent, or Firm—Pollock, Vande Sande & Priddy

[57] ABSTRACT

A pressurized water nuclear reactor comprises a reactor vessel arranged in a pool made in the form of a pressure vessel, the pool being filled with a strongly neutron-absorbing liquid, for example borated water. The reactor vessel, in addition to being connected to a primary system, is provided with a lower shutdown opening, arranged below the reactor core, for pool liquid and with an upper shutdown opening, arranged above the core, for pool liquid. The reactor vessel, the two emergency shutdown openings and the liquid-filled space of the pool are included in an emergency shutdown circuit, in which the difference in density between the liquid in the pool and the relatively warmer cooling water in the reactor vessel constitutes a pressure difference which by itself, or alternatively with the aid of some other pressure generation means, balances the pressure drop of the reactor cooling water across the core in such a way that no significant flow circulates in the emergency shutdown circuit during normal reactor operation.

12 Claims, 8 Drawing Figures

NUCLEAR REACTOR PLANT

TECHNICAL FIELD

This invention relates to a nuclear reactor plant of the kind comprising a pool which is filled and pressurized with a neutron-absorbing pool liquid and a reactor vessel within the pool and enclosing a water-filled reactor core provided with cooling channels. The reactor vessel includes an inlet chamber communicating with the pool liquid via a lower shutdown opening and an outlet chamber for cooling water which communicates with the pool liquid via an upper shutdown opening. Heat exchange means are provided, at least one outlet conduit connecting the heat exchange means to the outlet chamber and at least one inlet conduit connecting the inlet chamber to the heat exchange means. A circulating pump in the primary circuit of the reactor provides, during normal operation of the reactor, a substantially constant flow of reactor cooling water through the core which, in addition to being included in the primary coolant circuit of the reactor plant, is included in a shutdown circuit which comprises the inlet chamber, the lower shutdown opening, the pool, the upper shutdown opening and the outlet chamber. The said shutdown circuit has an inherent flow-driving tendency which, when cooling water flows through the reactor core, causes a pressure difference to prevail in the shutdown circuit, this pressure difference being counteracted and balanced by the pressure drop prevailing across the reactor core due to the flow therethrough of reactor cooling water, so that no significant supply of pool liquid to the primary circuit takes place.

BACKGROUND ART

A nuclear reactor of the above-mentioned kind is disclosed in Canadian Patent Specification No. 1,070,860. In this known reactor, the flow-driving tendency of the shutdown circuit is constituted to a predominant extent by a gas cushion included in the shutdown circuit in the upper part of the reactor vessel. The pressure difference which, during normal operation of the reactor, acts on the shutdown circuit is substantially equal to the static pressure difference between two pool liquid levels, the spacing apart of which is equal to the vertical dimension of the gas cushion. During normal operation of the reactor this pressure difference is substantially equal to the pressure drop across the reactor core. The imbalance required to enable the pressure difference of the shutdown circuit to drive a flow of pool liquid through the core will only occur if a significant change of the lifting pressure of the circulating pump takes place. A reaction to too high a temperature in the reactor cooling water can only be obtained indirectly, namely in the form of a reaction to an increase in hydraulic resistance occurring in the primary circuit due to the production of bubbles of steam. Such an increase in the hydraulic resistance in the primary circuit will reduce the cooling water flow through the core, and thus the pressure drop across the core will be reduced. A condition for sufficient reactor safety is then that a sufficiently large volume of steam bubbles, with a good safety margin, is achieved before the water in the core starts boiling. Since the steam volume in each bubble is reduced with increasing pressure, this condition sets a relatively low limit on the operating pressure at which this known reactor can be used. Calculations have shown that this pressure should be below 10 bar, which means that this known reactor is not well suited for generating steam for steam turbines.

Furthermore, it is a disadvantage in this known reactor that the driving pressure difference, which upon an emergency shutdown, for example due to a cut-out of the circulating pump, acts in the shutdown circuit, is increasingly reduced as when the amount of pool liquid supplied to the reactor core increases, and is equal to zero when the amount of pool liquid supplied to the reactor vessel corresponds to the volume of the gas cushion. This means that a predominant part of the flow-driving tendency, which is inherent in the shutdown circuit but latent during normal reactor operation, is not capable of driving liquid through the core for any appreciable part of the time during which the decay power of the core is still relatively great, for example greater than 50% of the maximum decay power.

DISCLOSURE OF THE INVENTION

The present invention aims to provide a reactor which, like the known reactor, can be shut down in an emergency quite independently of temperature-indicating devices, valves or similar technical means with movable parts, but which, contrary to the known reactor, is suited for generation of steam of a relatively high pressure and, therefore, suited for driving steam turbines.

One object of the invention is to increase the safety by making the emergency shutdown occur as a direct reaction to an impermissible increase in the temperature of the reactor coolant, independently of whether the pressure drop across the reactor core is or is not maintained. With a reactor according to the invention, the cooling water density reduction associated with such a temperature increase is sufficient for releasing an emergency shutdown. The release is then due to a disturbance of an existing balance between two pressure differences in a hydraulic system, in which a substantial part of one of these pressure differences is determined by the weight of a cooling water column.

A further object of the invention is to obtain the advantage that a substantial part of the pressure difference, which during normal reactor operation acts in the shutdown circuit and balances the pressure drop across the reactor core, shall be maintained after the time at which the reactor power, upon emergency shutdown, has been reduced to decay power and, as long as there is liquid in the pool, result in such a great flow of coolant through the core as to prevent impermissible heating of the core caused by the decay power.

Thus, the present invention, like Canadian Patent Specification No. 1,070,860, proposes a solution to a rather specific problem, namely how to arrange a reactor vessel, which is provided with open emergency cooling holes at both ends, below the liquid surface of a pool which is filled with a neutron-absorbing liquid, in such a way that the neutron-absorbing liquid does not flow in through any of the open emergency cooling holes during normal reactor operation. The Canadian Patent Specification provides one solution to this problem, and the present invention provides a completely different solution.

According to the present invention, in a nuclear reactor plant of the kind referred to, the portion of the reactor vessel that is filled with cooling water has a vertical extension which constitutes a predominant part of the vertical extension of the reactor vessel, and the inherent flow-driving tendency substantially is accomplished by at least one system for driving a liquid flow with a driving pressure difference which is substantially independent of the volume of liquid driven by the device. In this specification, "predominant" is used in its commonly accepted sense to indicate prevalence over all others in number or magnitude.

BRIEF DESCRIPTION OF THE DRAWINGS

The invention will now be described, by way of example, with reference to the accompanying schematic drawings wherein.

DESCRIPTION OF PREFERRED EMBODIMENTS

Figure 1:
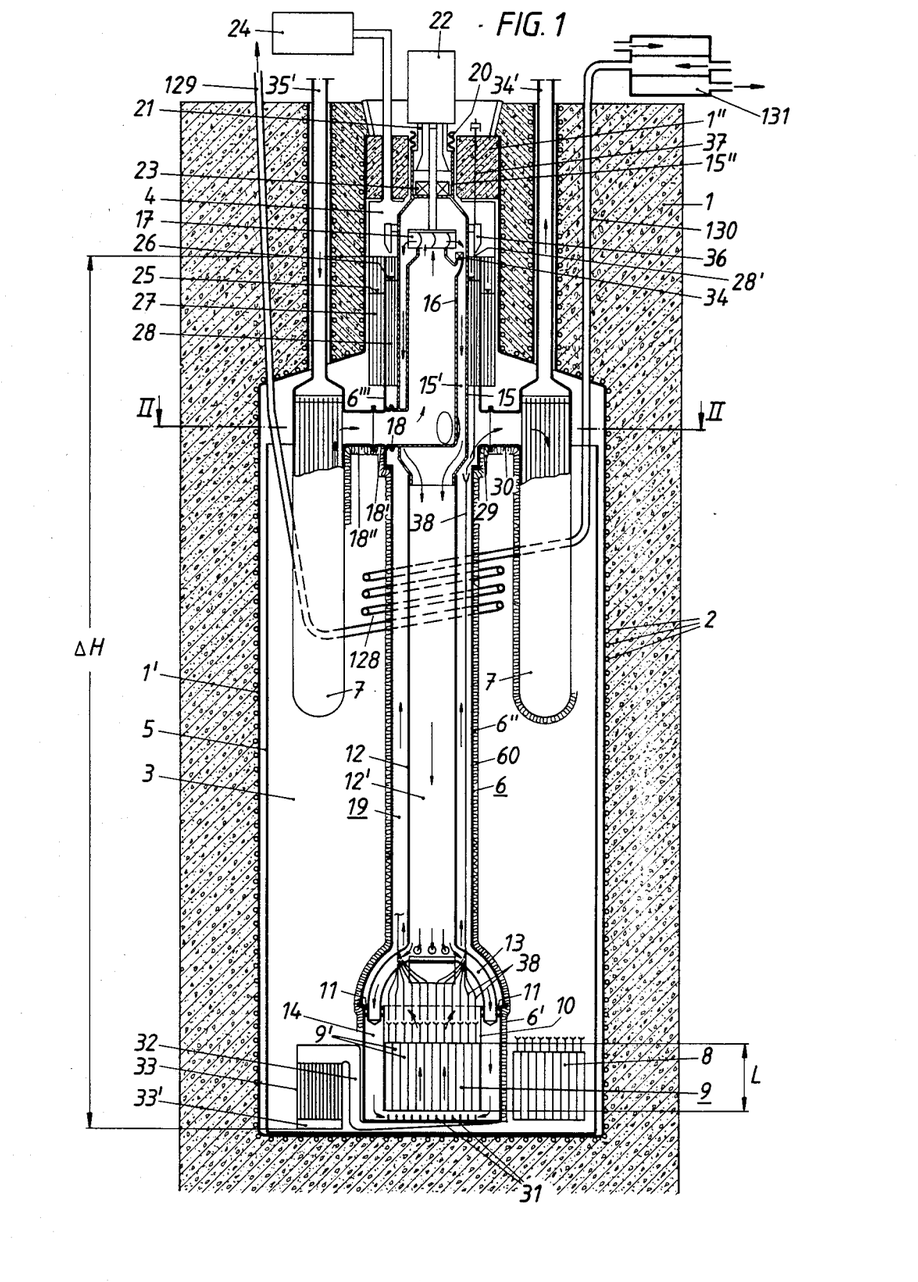
FIG. 1 is a sectional side view, taken along the line I—I of FIG. 2, of a first embodiment of a reactor plant in accordance with the invention.
Figure 2:
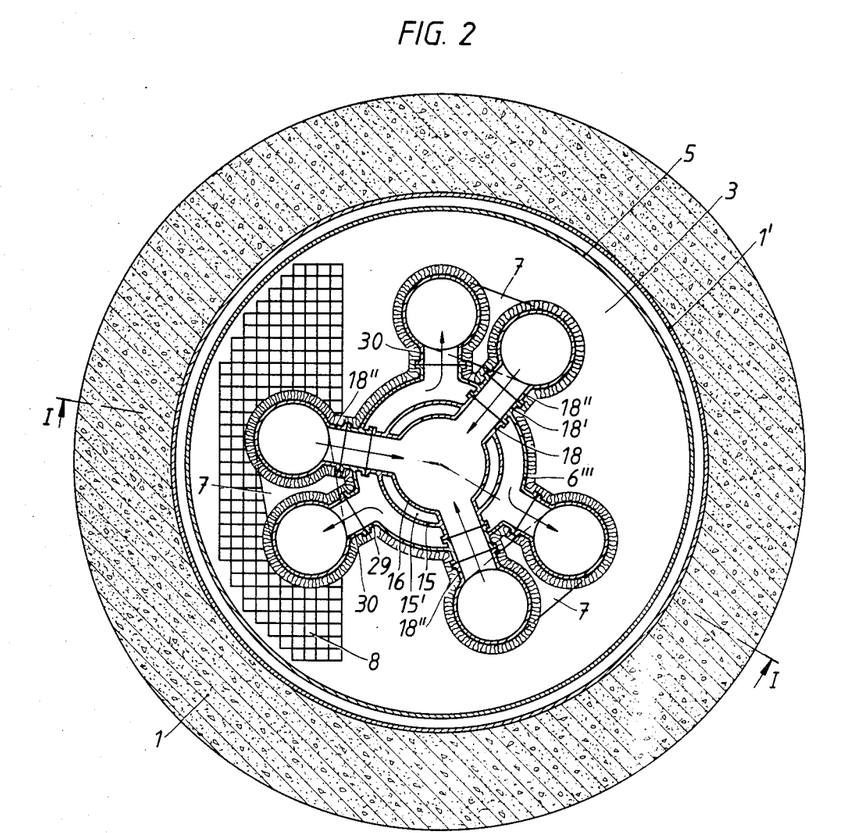
FIG. 2 is a sectional view taken along the line II—II of FIG. 1.

The nuclear reactor plant shown in FIGS. 1 and 2 comprises a pool 1 which is a substantially circular-cylindrical, hollow body made of prestressed concrete and dimensioned for an internal pressure of at least 15 bar, for example 70 bar. The pool 1 has a metallic lining 1' with an adjacent cooling tube system, embedded in the concrete of the pool, with a large number of cooling tubes 2. The pool 1, which is provided with a pool cover 1'', encloses a pool space 3 which for the major part is filled with a neutron-absorbing liquid, in the form of borated water, and which houses a gas cushion 4, an inner tank 5, a reactor vessel 6 surrounded by the walls of the tank 5, heat exchange means in the form of three U-shaped steam generator elements 7, and a device 8 for the storage of spent fuel.

The cooling system provided by the tubes 2 embedded in the concrete is intended to protect the pool walls from harmful heating. In addition, a cooler 128 is mounted in the pool and serves to cool the pool liquid to the desired temperature. The cooler 128 is arranged to be traversed by a cooling fluid, for example water, and is arranged with a predominant part of its total cooling surface in contact with the pool liquid. The cooling fluid is supplied to, and withdrawn from, the cooler via an inlet pipe 130 and a return pipe 129, respectively, these pipes being connected to a heat exchanger 131 located outside the pool.

The reactor vessel 6 comprises a lower portion 6', an intermediate portion 6'' and an upper portion 6''', which portions are joined together by flanged connection means. Within the lower portion 6' is a reactor core 9 with a plurality of vertical fuel assemblies 9' and vertical cooling channels. The core 9 is surrounded by a cylindrical casing 10 which is open at both ends. The casing 10 is provided at its upper end with an outwardly-directed flange which is positioned in a horizontal plane and the outer edge of which is attached to the upper edge of the lower portion 6' of the reactor vessel 6. This flange on the casing 10 is provided with a plurality of through-going circumferentially spaced-apart, circular holes, each of which is provided with an annular, elastically resilient sealing device 11. A tube 12, arranged coaxially with respect to the reactor vessel portion 6'', has at its lower end a plurality of branches 13, each of which passes through a respective one of the sealing devices 11 into the space 14 between the lower reactor vessel portion 6' and the casing 10.

The upper end of the tube 12 sealingly surrounds the lower, open end of a substantially hollow-cylindrical body 15, which is closed at its upper end. The body 15 surrounds a smaller, substantially hollow-cylindrical body 16, there being an annular space 15' between the bodies 15 and 16. The upper end of the body 16 is hydraulically connected to the inlet side of a circulating pump 17, the outlet side of which is hydraulically connected to the annular space 15'. The pump 17 is provided with a shunt circuit by arranging a hydraulic connection between the hollow cylinders 15 and 16 in the form of a shunt valve 34. During normal operation of the reactor, pump 17 provides a substantially constant flow of reactor cooling water through the core.

The lower, otherwise closed, end of the body 16 is provided with three flexible inlet nozzles 18. The nozzles 18 pass in a pressure-tight manner through the cylindrical wall of the surrounding body 15 and are each detachably connected to a nozzle 18' at the wall of the upper reactor vessel portion 6'''. Each of the nozzles 18', in its turn, is flanged to an outlet nozzle 18'' belonging to the primary circuit of a respective one of the three steam generator elements 7. Each of the steam generator elements 7 has, on its secondary side, an outlet conduit 34' for steam and a return conduit 35' for feed water.

The hollow-cylindrical body 16 thus constitutes an inlet conduit which connects a heat exchanger, formed by the steam generator elements 7, with an inlet chamber of the reactor vessel 6, which inlet chamber comprises the space 15' between the bodies 15 and 16, the space 12' in the tube 12 and the space 14. The reactor vessel has an outlet chamber 19, which comprises the space defined between the tube 12, including the branches 13, and the reactor vessel portion 6'' and the space which is defined between the upper reactor vessel portion 6''' and the hollow-cylindrical body 15. The upper reactor vessel portion 6''' has three outlet nozzles 29, each of which is connected by a respective outlet conduit 30 to an inlet opening of a respective one of the steam generator elements 7. The body 15 has an upper hollow-cylindrical portion 15'', which passes through a central opening formed in the concrete cover 1'' of the pool. The upper portion 15'' is externally sealed in relation to the cover 1'' by means of a bellows-shaped metallic body 20, which is welded between the upper portion 15'' and a metallic ring cast into the concrete cover 1''. A plurality of legs 21 welded to the portion 15'' support a pump motor 22, which is connected to the pump 17 by a shaft which passes through a shaft seal 23 intended to seal against the pressure difference between the reactor pressure and atmospheric pressure.

At the top of the pool 1 there is a gas cushion 4 in the form of trapped steam. The gas cushion 4 communicates with a steam boiler 24 which is provided with a pressure regulator (not shown). The interface between the gas cushion 4 and the pool liquid is designated by the numeral 25, and the interface between the gas cushion 4 and the water present in the reactor vessel 6 is designated by the numeral 26. As illustrated in FIG. 1 and mentioned previously, the portion of the reactor filled with cooling water has a vertical extension which constitutes a predominant part of the vertical extension of the reactor vessel 6. Annuli 27 and 28 of honeycomb material with thin vertical channels are arranged radially outside and radially inside the wall of the vessel portion 6''', respectively, these annuli extending along a vertical distance within which the interfaces 25, 26 may move. Each of the annuli 27 and 28 serves as a "gradient lock", that is, a means for obtaining a stable vertical temperature gradient in a vertical connecting member between a liquid disposed in one region and a relatively hotter fluid such as stem disposed in a higher region. As an alternative to such honeycomb material, the annuli 27, 28 may comprise a plurality of concentric hollow cylinders. In normal reactor operation, the difference in level between the interfaces 25 and 26 may be zero, or at any rate smaller than 30%, and preferably smaller than 20%, of the distance between the upper open end 28' of the reactor vessel portion 6''' and the upper edge of the reactor core; and the interface 25 may be higher than the interface 26, or inversely.

The lower portion 14 of the space 12' is in hydraulic communication with a vertical inlet drum 33 via a plurality of nozzles 31 arranged at the bottom of the reactor portion 6' and a tube 32 connected to the nozzles 31. The drum 33 has an inlet opening 33' for pool liquid at its lower end. The inlet drum 33 is filled with honeycomb material and thus contains a gradient lock which, in principle, consists of a large number of thin parallel-connected, vertical tubes. Alternatively, a gas cushion may be used as the gradient lock.

In the event of a shutdown of the reactor plant, for example an emergency shutdown, borated water from the pool flows in through the opening 33', and consequently this opening is referred to as the "lower shutdown opening" in the present specification. In a corresponding manner, the opening 28' at the upper end of both the reactor vessel and the annulus 28 is referred to as the "upper shutdown opening".

The reactor vessel 6, the steam generator elements 7 and the intermediate connecting conduits are each provided externally with a heat-insulating layer 60, for example in the form of a water-filled metallic tissue, so that the mean temperature of the pool liquid during normal reactor operation is at least 50° C., preferably at least 100° C., lower than the temperature of the reactor cooling water flowing from the outlet chamber 19 of the reactor vessel. This means that the density of the reactor cooling water is considerably lower than the density of the pool liquid. Thus, the pressure exerted by a pool liquid column is higher than the pressure exerted by a cooling water column of the same height. In the reactor shown in FIGS. 1 and 2, the difference in level between the interface 26 and the lower end of the reactor core is so great that the pressure difference between a pool liquid column having a height equal to this difference in level and a cooling water column of the same height during normal reactor operation constitutes a predominant part of the pressure drop across the reactor core.

In the reactor plant shown in FIGS. 1 and 2, the flow rate of cooling water flowing through the core is adjusted by means of the shunt valve 34 in such a way that the pressure drop across the reactor core during normal operation of the reactor is equal to the difference between a first pressure, corresponding to a pool liquid column from the interface 25 to a level approximately at the lower edge of the core, and a second pressure, corresponding to a cooling water column from the same level to the interface 26. The pressure difference, caused by the difference in density and the difference in height, if any, between the pool liquid column and the cooling water column of maximum height is somewhat greater than the pressure drop across the reactor core at the desired flow of cooling water. Thus, the vertical dimensions of the pool and the reactor are somewhat larger than is strictly required. Therefore, for the purpose of achieving balance between the above-mentioned pressure drop and the pressure difference between the two liquid columns, the lighter of the two liquid columns has been made somewhat longer than the other, which results in the pressure difference between the two columns becoming somewhat smaller than the value which would have been obtained if the interfaces 25 and 26 had had the same level.

In the reactor shown, the difference between (a) the pressure exerted by a theoretical pool liquid column of the same height above the lower edge of the core as the cooling water column located in the outlet chamber 19, and (b) the pressure exerted by this cooling water column, constitutes more than 100% of the pressure drop across the reactor core during normal reactor operation, for example 110% of this pressure drop. For economic reasons this percentage should generally be smaller than 140% in a reactor plant according to the invention, since otherwise quite unacceptable vertical dimensions of the pool and the reactor vessel would be obtained.

On the other hand, a reactor plant of the same kind as that shown in FIGS. 1 and 2 can be made with relatively small vertical dimensions of the pool and the reactor vessel, in which case the difference between the pressure exerted by a pool liquid column and the pressure exerted by a cooling water column of the same height is less than that required to balance the pressure drop across the reactor core during normal reactor operation. In order to achieve balance, the difference between the pressure exerted by the above-mentioned pool liquid column and the pressure exerted by the above-mentioned cooling water column is in such a case increased by making the pool liquid column longer than the cooling water column, that is, by arranging the interface 26 at a level which is lower than the interface 25. However, the cooling water column is always made so high that the difference between the pressure exerted by a pool liquid column of the same height and the pressure exerted by the cooling water column corresponds to a predominant portion such as more than 60% of the pressure drop across the reactor core during normal reactor operation, preferably more than 80% thereof. This usually means that the difference in height $\Delta H$, between the upper shutdown opening 28' and the lower shutdown opening 33' is greater than seven times the vertical dimension L of the core, and that the portion of the reactor vessel filled with cooling water has a vertical extension which constitutes a predominant part of the vertical extension of the reactor vessel.

Since the reactor vessel 6 has a lower shutdown opening 33' where the pool liquid may flow in and an upper shutdown opening 28' where reactor cooling water may flow out into the pool, the reactor core is included not only in the primary cooling circuit of the reactor but also in a pneumatic-hydraulic shutdown circuit, in which the strongly borated water of the pool is included. In addition, the shutdown circuit includes the inlet drum 33 with its associated tube 32, the nozzles 31, the lower portion of the inlet chamber 12', the outlet chamber 19 and the gas cushion 4. In the shutdown circuit, the combination of a constantly hot water column located in the reactor vessel and a constantly cooler liquid column located outside the reactor vessel constitutes a flow-driving system. This system has a flow-driving capacity, that is, a driving pressure difference, which is substantially constant during the initial part of the shutdown process and substantially independent of the volume of liquid driven by the system, at least during the initial part of the shutdown process. In this specification, the expression "initial part of the shutdown process" is defined as the part of the shutdown process taking place from the first introduction of pool liquid into the reactor vessel to the stage when the amount of pool liquid introduced into the reactor vessel is equal to the volume of reactor coolant present below the top of the reactor core during normal reactor operation.

During normal reactor operation, the above-mentioned pressure difference acting in the shutdown circuit is balanced by the pressure drop created across the reactor core due to the flow of coolant in the primary circuit, and no transport of pool liquid to the primary cooling circuit of the reactor takes place. If the flow of cooling water through the reactor is reduced because of a fault in the primary cooling circuit of the reactor, for example a faulty pump, a corresponding reduction of the pressure drop across the reactor core occurs, and this pressure drop is no longer able to balance that pressure difference which is tending to drive a flow of pool liquid through the shutdown circuit, and accordingly the pool liquid level rises in the inlet drum 33. If the reduction of the pressure drop across the core caused by the faulty pump is greater than the pressure that may be exerted by a cooling water column of the same height as the steam-filled portion of the outlet chamber 19, a flow of water will leave the reactor vessel via the upper shutdown opening 28', and an equally large flow of pool liquid will flow in through the lower shutdown opening 33'. This flow is relatively small in the case of small deviations from normal circulation in the primary cooling circuit of the reactor and relatively great in the case of large deviations, and it is driven by a pressure difference which acts in the shutdown circuit and which is caused by differences in height of pool and cooling water columns and by the difference in density between the liquid present in the pool and the relatively hotter water present in the reactor vessel. In the case of a considerable reduction of the water flowing through the primary cooling circuit, an emergency shutdown occurs which is primarily caused by a corresponding reduction of the pressure drop across the reactor core. In addition, the emergency shutdown is accelerated by the temperature of the reactor cooling water increasing, which results in an increase of the above-mentioned difference in density.

If an emergency shutdown takes place, for example because the pump motor 22 stops, the reactor power will drop to a value which corresponds to the decay power even when the amount of water present in the core has received a boron content which is considerably smaller than the boron content in an equal amount of pool liquid, for example smaller than 50% of this boron content.

As long as a considerable decay power is present, the difference in density between the liquid of the pool and the liquid of the reactor vessel will still be great enough to provide a flow-driving pressure difference in the shutdown circuit, at least for as long as a predominant part of the original liquid quantity remains in the pool. The pool is constructed with a pool liquid volume which is at least three times, preferably at least ten times, as great as the volume of the reactor vessel.

An advantage with a reactor plant according to the invention is that, at increased reactor temperature, the shutdown circuit is able to release an emergency shutdown or a controlled action as a direct response to the temperature increase, whereas in the previously described known reactor such a reaction can only be obtained as an indirect reaction, namely in that the formation of steam bubbles at overtemperature results in increased hydraulic resistance, whereupon the shutdown circuit in its turn responds to insufficient water flow. If the water temperature in the outlet chamber 19 of the reactor vessel increases, the reduction in density caused by the temperature rise will be compensated for by a corresponding rise of the interface 26. If the water temperature exceeds a certain allowable value, which is below the boiling point at the prevailing reactor pressure, the interface 26 rises to the upper edge of the reactor vessel. An additional increase in temperature will result in the driving pressure difference of the shutdown circuit exceeding the pressure drop across the reactor core, so that pool liquid flows into the reactor vessel via the lower shutdown opening 33'. This flow will cease only if a temperature reduction occurs, for example because of the strongly borated pool liquid introduced into the reactor. On the other hand, if the temperature rise continues, the flow of pool liquid into the reactor vessel will increase.

If a sudden temperature increase occurs in the reactor core, a considerable amount of steam may be generated in the cooling water, which results in a considerable increase of the hydraulic resistance in the core, and thus of the pressure drop across the core. In the reactor plant shown in FIGS. 1 and 2, the core and the reactor vessel are dimensioned in such a way that an increase of the flow-driving pressure difference due to density-decreasing steam bubbles appearing in the reactor vessel, is at least as great as the increase of the pressure drop across the reactor core caused by said steam generation.

If, by mistake, the pool should be subjected to a greater pressure than that for which it is dimensioned, so that a crack occurs in the pool wall, the inner tank 5 can still be counted on to remain intact since this tank can never be subjected to a greater pressure than the static liquid pressure. The volume of the inner tank 5 constitutes at least 50%, preferably at least 70%, of the pool volume. During normal operation of a reactor according to the invention, the pressure in the pool is greater than 15 bar, preferably greater than 25 bar.

In the reactor plant of FIGS. 1 and 2, and also in the embodiments described hereinafter, shimming is carried out with boric acid, and control rods in the normal sense are not required. Instead of this there is provided a shutdown device which is intended to supply the core with absorber bodies in the case of shutdown of the reactor for a long period and which is also effective as an additional emergency shutdown system. The shutdown device has a reservoir 36, arranged above the reactor vessel, which is composed of a large number of vertical reservoir tubes (not shown). Each reservoir tube comprises a large number of boron-steel balls. The reservoir 36 can be rotated around a vertical center line by means of a power transmitting device 37 passing through the pool cover 1''. During reactor operation the balls are held in position in the reservoir by means of a perforated plate (not shown). On the lower side of the plate a plurality of distribution tubes 38 for the boron steel balls are arranged with their upper ends below a corresponding hole in the perforated plate. The lower ends of the distribution tubes 38 open above a corresponding fuel assembly 9'.

Each hydraulic connection 18, 18', 18'', 29, 30 between the reactor vessel 6 and the steam generator elements 7, is in its entirety arranged above a level which extends above the upper edge of the reactor core and the distance of which from said upper edge corresponds to at least 20%, preferably more than 35%, of the maximum liquid depth in the pool 1. If a leakage should occur between the primary side and the secondary side of any of the three steam generator elements 7, pool liquid may be forced out through the steam conduits 34' and the return conduits 35'. Since the above-mentioned hydraulic connections are arranged above the above-mentioned level, such a leakage can never cause the pool liquid to sink below this level.

In the embodiment of the invention shown in FIGS. 1 and 2, there is an inherent pressure difference in the emergency shutdown circuit which gives a flow of pool liquid in the emergency shutdown circuit when the pressure drop across the core becomes smaller than this inherent pressure difference. Instead of achieving such an inherent pressure difference mainly by utilizing the difference in density between the pool liquid and the reactor water, a predominant part of the pressure difference in question can be generated with the aid of a special pump intended for this purpose, for example in the embodiment of the invention shown in FIG. 3, in which the items designated by the numerals 2, 60, 128, 129 and 130 are the same as the correspondingly designated items in FIG. 1.

Figure 3:
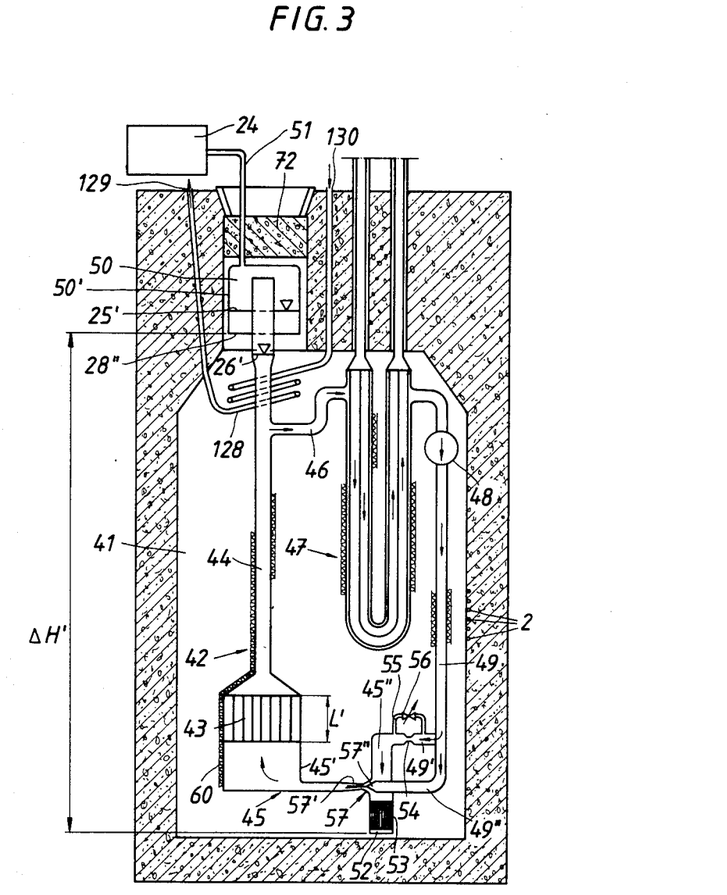
FIGS. 3, 4, 5 and 6 are sectional side views of second, third, fourth and fifth embodiments, respectively, of reactor plants in accordance with the invention.

In the embodiment of the reactor plant shown in FIG. 3, the numeral 41 designates a pool made in the form of a substantially circular-cylindrical, hollow pressure vessel. The pool 41 is provided with a cover 72 and is filled with strongly borated water up to this cover. The pool comprises a reactor vessel 42, which encloses a reactor core 43. The reactor vessel 42 has an outlet chamber 44 and an inlet chamber 45, which together with the core 43, an outlet conduit 46, a heat exchanger in the form of a U-shaped steam generator element 47, a circulating pump 48, and an inlet conduit 49 are included in the primary cooling circuit of the reactor. The steam generator element 47 is of the same type as the element 7 of FIGS. 1 and 2. The uppermost portion of the outlet chamber 44 is defined by a bell-shaped body 50' attached to and surrounding the top of a long tubular portion. At its upper end the outlet chamber 44 is connected to a gas cushion 50 in the form of steam which is supplied to the body 50' by a pressurizer in the form of a steam boiler 24 via a pressurization tube 51, a substantially constant pressure of at least 15 bar thus being maintained in the gas cushion 50 and in the pool liquid.

In addition to a space 45' located below the core, the inlet chamber 45 also comprises a side space 45'', which at its lower end is provided with an inlet opening 52 for pool liquid and a gradient lock 53 in the form of a cylindrical body of honeycomb material with a plurality of vertical channels. The inlet opening 52 constitutes the lower shutdown opening. The upper shutdown opening is designated 28''. The interface 25' between the gas cushion 50 and the pool liquid lies above the interface 26' between the gas cushion 50 and the reactor cooling water.

The inlet conduit 49 has two branches 49' and 49'', a predominant part of the water flow of the primary cooling circuit being supplied to the reactor core 43 via branch 49' and the side space 45''. The branch 49' has a portion 54 of relatively small cross-section which is by-passed by a shunt circuit 55. This shunt circuit is provided with a regulating valve 56, by means of which the magnitude of the water flow supplied to the side space 45'' can be regulated. The side space 45'' is connected to the space 45' via a tube portion 57' in the form of a venturi tube which, together with a nozzle 57'' formed at the end of the branch 49'', forms a water jet pump 57. Instead of the jet pump 57, an auxiliary pump may be provided which is driven by a special motor, which is preferably interlocked with the motor connected to the pump 48 in such a way that it stops in the event of stoppage or a large reduction in speed of the latter motor.

The reactor core 43, the outlet chamber 44, the gas cushion 50, the pool space, the inlet opening 52, the side space 45'', the tube portion 57' and the space 45' form an emergency shutdown circuit, in which the water jet pump 57 provides a driving pressure difference. During normal reactor operation, the pressure drop across the reactor core 43 is balanced only to a very small extent by the pressure difference which corresponds to the difference in level between the interfaces 26' and 25' of the gas cushion 50. During normal reactor operation the pressure drop across the reactor core is balanced substantially by two pressure-generating systems, each system having the ability to maintain a flow-driving pressure substantially independently of the time integral of the flow. One of these systems is a self-circulating system having an inherent flow-driving pressure difference which in principle is due to the difference in density between the pool liquid and the relatively hotter water of the reactor vessel. The other pressure-generating system is constituted mainly by the water jet pump 57. Because of the water jet pump, it is possible to construct the pool and the reactor vessel with considerably smaller vertical dimensions than in the case of the plant shown in FIG. 1. In the case of an abnormal temperature increase in the reactor vessel, the difference in density between the pool liquid and the reactor coolant will be so great that pool liquid can flow in through the lower shutdown opening 52.

Figure 4:
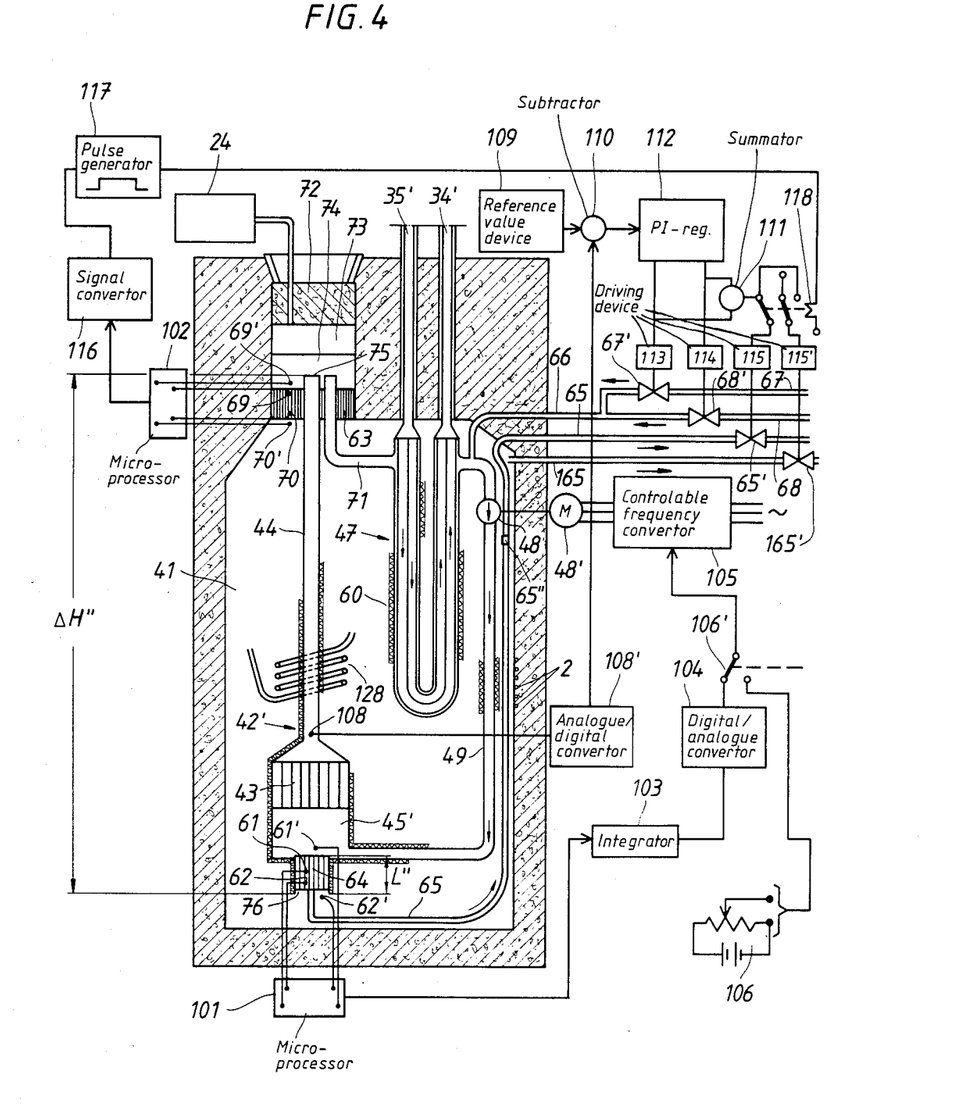

The embodiment of the reactor plant shown in FIG. 4 differs from that shown in FIG. 3 in that the water jet pump 57 with associated equipment and the bell-shaped body 50' are omitted. In FIG. 4, the items designated by the numerals 2, 34', 35' 60 and 128 are the same as the correspondingly designated items in FIG. 1, and the items designated by the numerals 43, 45' and 49 are the same as the correspondingly designated items in FIG. 3. The numeral 41 designates a pool made in the form of a substantially circular-cylindrical, hollow pressure vessel. At its upper end the vessel 41 is formed with a substantially circular-cylindrical throat which is sealed in a pressure-tight manner by means of a pool cover 72. The pool is pressurized to a pressure of at least 15 bar by means of a steam boiler 24. A gas cushion 73 in the form of a space filled with steam is defined in the above-mentioned throat between the pool cover 72 and a space 74 containing cooling water. A relatively thin boundary layer, containing diluted boric acid solution, is situated mid-way between the lower and upper ends of a gradient lock 63 which is fitted into the above-mentioned throat and which comprises a plurality of thin, vertical channels. Upper and lower transducers 69 and 70, respectively, in the form of thermocouples, are arranged in the gradient lock 63, the vertical distance between these transducers being larger than the thickness of the above-mentioned boundary layer during normal reactor operation. In the operating state of the reactor plant, the transducer 69 is only in contact with liquid of the same, or approximately the same, temperature as the cooling water flowing out of the outlet chamber 44 of the reactor vessel, whereas the transducer 70 is only in contact with liquid having a temperature equal to, or approximately equal to, the mean temperature of the boric acid solution located in the pool. Upper and lower reference value generators 69' and 70', respectively, in the form of thermocouples, are arranged above and below the gradient lock 63. An outlet conduit 71 is hydraulically connected between a heat exchanger in the form of a steam generator element 47 and the outlet chamber. The outlet conduit 71, contrary to the corresponding conduits 30 and 46 in FIGS. 1 and 3, is not directly connected to the outlet chamber of the reactor vessel, but hydraulically connected to said chamber via the space 74 which is filled with reactor coolant and positioned between the above-mentioned boundary layer and the gas cushion 73.

The reactor vessel 42' has an upper shutdown opening 75 and a lower shutdown opening 76. In the shutdown opening 76 there is fitted a circular-cylindrical gradient lock 64 comprising at least one body of honeycomb material. In the gradient lock there are arranged two, vertically spaced-apart transducers 61 and 62, in the form of thermocouples, and two reference generators 61' and 62', also in the form of thermocouples, are arranged respectively above and below the gradient lock.

Signals from the transducers 61, 62, 61' and 62' are supplied to a control system (described in greater detail hereinafter) for position control of the boundary layer in the lower gradient lock 64, in such a manner that the boundary layer between the hot reactor coolant and the relatively cooler pool liquid, during normal operation, is retained in the region between the transducers 61 and 62. If the boundary layer tends to be displaced to too low a level, the speed of the circulating pump 48 is reduced, which results in the boundary layer being raised to a higher level, and vice versa. The reactor is provided with two outflow pipes 65 and 165 for pool liquid which are provided with outlet valves 65' and 165', respectively. The valves 65' and 165' are operated by controllable driving devices 115 and 115', respectively. The outflow pipe 65 has a lower inlet opening which is arranged in the lower part of the gradient lock 64 as well as an inlet opening 65" arranged in the upper pool space. The inlet opening 65" is preferably made with low resistance to steam flow and relatively greater hydraulic resistance. The purpose of the opening 65" is to let out steam in the case of a rupture in the pipe 65 outside the pool.

The transducers 69, 70, 69' and 70' deliver signals to a regulating system, the duty of which is to ensure that the boundary layer in the upper gradient lock 63 lies between the transducers 69 and 70. Since no continuous outflow takes place from the reactor to the pool, the temperature in the upper part of the gradient look 63 will slowly decrease. When the temperature at the level at which the transducer 69 is located has fallen below a certain value, a level indicator, comprising the transducers 69', 69, 70, 70' and a microprocessor 102, sends a signal to a relay 118 via a signal converter 116 and a pulse generator device 117, with the result that the outlet valve 65' is closed, whereupon feed water supplied by pipes 67 (low borated) and 68 (high borated), which are connected to the primary system of the reactor via a common lead-in tube 66 passing through the wall of the pool 41, will tend to increase the volume of the reactor water. Since the pump 48 is controlled to maintain the boundary layer of the lower gradient lock 64 at a substantially constant level, an outflow of reactor water into the pool will take place in the upper gradient lock, i.e. hot reactor water replaces the cooler liquid in the upper part of the gradient lock 63 so that the transducer 69 again acquires a temperature corresponding to the desired position of the boundary layer. In order to avoid an increase of the water volume in the space 74, a volume of pool liquid, equal to that entering via the pipes 67 and 68, is taken out through the valve 165'. When the boundary layer in the upper gradient lock 63 has a normal position (between the transducers 69 and 70), the valve 65' is open and the valve 165' is closed. The flow supplied through the pipes 67 and 68, which are provided with valves 67' and 68', respectively, is equal to the outgoing flow through the valve 65'. It is generally not necessary to take any measure to prevent the boundary layer from sinking below the transducer 70.

Because the lower end of the outflow pipe 65 is disposed in the gradient lock 64, a renewal of the liquid of the boundary layer in the lower gradient lock takes place continuously and a fairly constant characteristic of this boundary layer can be maintained. Due to this renewal and due to the activity of the automatic temperature control system, a small flow of reactor water leaves the primary circuit all the time. Since the lower inlet opening of the outflow pipe 65 is disposed in, or in the vicinity of, the lower shutdown opening, no significant part of this flow of reactor water is mixed with the pool liquid. Thus, if the reactor water for some reason should contain radioactive substances, a delivery of such substances to the pool liquid is substantially avoided.

When a signal indicating too high a boundary layer in the upper gradient lock 63 is given, the valve 65' is shut and the valve 165' is opened. A quantity of reactor water supplied through the pipe 66 then forces the same quantity of pool liquid out of the pipe 165 with the result that the pool liquid level, and accordingly the boundary layer, falls.

Figure 4A:
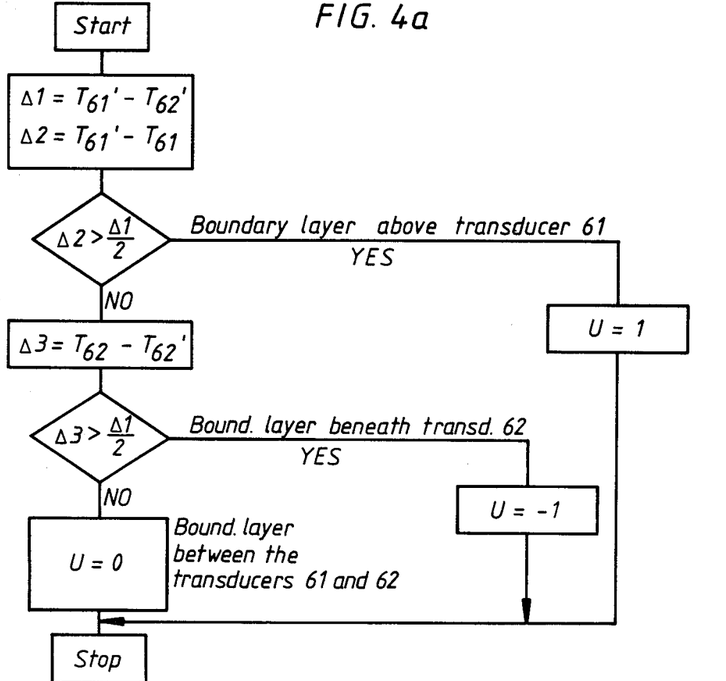
FIG. 4a is a flow chart of a microprocessor included in the control equipment of the reactor plants of FIGS. 1, 3, 4, 5 and 6.

The signals from the transducers 61', 61, 62, 62' are supplied to a microprocessor 101 which operates according to the flow chart shown in FIG. 4a, where the respective signal values are designated $T_{61'}$, $T_{61}$, $T_{62}$, $T_{62'}$. If the boundary layer in the lower gradient lock 64 rises to a level above the measuring point of the transducer 61, a positive pulse is given at the output of the microprocessor, i.e. $U=1$. If the boundary layer drops beneath the measuring point of the transducer 62, on the other hand, a negative pulse is delivered, i.e. $U=-1$. When the boundary layer lies between the measuring points of the transducers 61 and 62, no pulse is given, i.e. $U=0$. The output signals of the microprocessor are supplied to a digital integrator 103, the output value of which is supplied to a digital/analogue converter 104. The output side of the converter 104 is connected, via a change-over switch 106', to the control circuit of a controlled frequency converter 105, which is connected by its output to an asynchronous motor 48', which is mechanically connected to the circulating pump 48. The frequency of the frequency converter 105, and preferably also its voltage, varies in dependence on the supplied control voltage. In the case of manual control of the pump speed, the change-over switch 106' is put in its second position, the frequency converter 105 then receiving control voltage from a manually-controllable voltage source 106.

When a reactor in accordance with the invention is shut-down, the primary circuit of the reactor contains an aqueous solution, the boron content of which greatly exceeds that which is required to prevent a chain reaction in the reactor, and the surrounding pool space is filled with an aqueous solution with approximately the same boron concentration. Start-up of the reactor is done by supplying clean water to the water located in the primary circuit, whereas the corresponding amount of borated water at the same time leaves the pool. The inlet pipes and the outflow pipes required for this purpose and for control purposes are shown in FIG. 4 only, but the corresponding piping is assumed to exist in the other embodimens of the invention shown in the drawings.

Figure 4B:
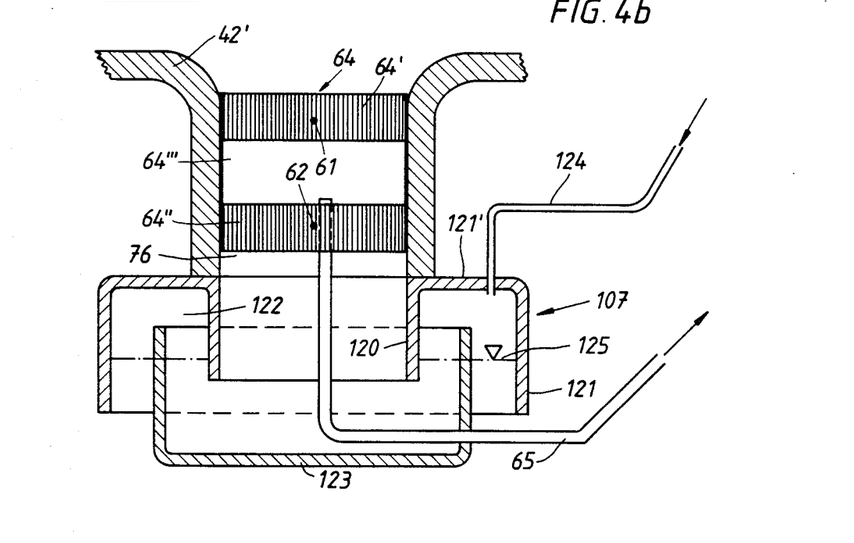
FIG. 4b is a sectional side view, on an enlarged scale and in relatively detailed form, of the lower part of the reactor vessels shown in FIGS. 3, 4, 5 and 6.

In the embodiments shown in FIGS. 3 and 4 and also in the embodiments described hereinafter with reference to FIGS. 5 and 6, the lower or upper shutdown opening is provided with a device capable of absorbing an amount of gas in such a way that a gas lock is formed. Such a gas lock is not needed during normal operation but is very advantageous when start-up of a shut-down reactor is to be carried out. At the beginning of such a start-up, the pool is first pressurized with the aid of the boiler 24, and the circulation pump 48 is started and driven at a low speed. Deboration of the reactor cooling water then takes place by the supply of pure water to the primary circuit via the inlet pipe 66, while at the same time an equally large flow of borated water leaves the pool via the outflow pipe 65. With the aid of the above-mentioned gas lock, it is possible to avoid pool liquid flowing into the reactor vessel 42' at the stage when the temperature difference between reactor coolant and pool liquid is very small. Such a gas lock is shown in FIG. 4b, which on a relatively large scale shows the lower circular-cylindrical portion of the reactor vessel 42' and an annular body 107 attached to said circular-cylindrical portion and comprising two coaxially arranged circular-cylindrical portions 120 and 121 which, together with an intermediate annular plane portion 121', form an open annular channel 122. A cup-shaped body 123 is arranged coaxially between the circular-cylindrical portions 120 and 121 and is hydraulically connected to the outflow conduit 65. A gas, for example nitrogen, is supplied to the channel 122 via a tube 124, so that a gas cushion is formed above the level 125 of the pool liquid. The gradient lock 64 comprises two circular discs 64' and 64" which are arranged in a circular cylindrical hollow cylinder with an intermediate gap 64'''

Upon reactor start-up, the speed of the circulating pump 48 is gradually increased as the reactor coolant temperature rises. During normal operation, the reactor temperature is maintained at the desired value by means of an automatic control system provided for this purpose which, as shown in FIG. 4, includes a thermocouple 108, an analogue/digital converter 108', a desired-value setter 109 for the desired temperature of the core outlet water, a subtractor 110, a summator 111, a regulator 112, a driving device 113 for the valve 67' in the inlet pipe 67 which supplies pressurized water having a very low concentration of boric acid, if any, a driving device 114 for the valve 68' in the inlet pipe 68 which is connected to a pressure container (not shown) containing strongly borated water, and the driving device 115 for the valve 65'.

The regulator 112 is of the PI type, that is, proportional and integrating. If the output signal of the regulator 112 is positive, which occurs at too low temperature in the outlet chamber 44, this signal is delivered to the driving device 113, the valve 67' thus being opened to admit weakly borated water; whereas, the control signal to the driving device 114 is very small—less than 10% of its maximum value. If, on the other hand, the output signal of the regulator is negative, the absolute value of the signal is given as a control signal to the driving device 114, whereupon the valve 68' opens and the control signal to the driving device 113 is very small—less than 10% of its maximum value. The fact that the summator 111 supplies a control signal to the driving device 115 which is greater than the very small ones mentioned above as soon as any of the devices 113 and 114 receives a control signal which is greater than zero, results in pool liquid leaving the pool via the outflow pipe 65 upon each supply of relatively pure or borated water via the lead-in tube 66. A condition for this to take place is that the contact member of the relay 118 is in the position shown in FIG. 4, which takes place as long as the boundary layer in the upper gradient lock 63 is not positioned above a certain allowable boundary layer region. As previously mentioned, the position of the boundary layer is controlled by means of a control device which, in addition to the relay 118, comprises the four transducers 69', 69, 70, 70', the microprocessor 102, the signal converter 116 and the pulse generator device 117. The microprocessor 102 is constructed and arranged in the same way as the microprocessor 101, and the flow chart shown in FIG. 4a applies to the microprocessor 102 if modified by replacing the output signals $T_{61}$, $T_{61'}$, $T_{62}$, $T_{62'}$ by the output signals from the transducers 69, 69', 70 and 70', respectively, and replacing the designations 61 and 62 used in the text by the designations 69 and 70, respectively. Upon an input signal 1, the signal converter 116 produces an output signal of 24 volts. In other cases, the output signal is zero. Each time the input signal of the pulse device 117 proceeds from 0 to 24 volts, a 24 volt pulse is produced on the output side of the pulse device, whereupon the two-position relay 118 assumes a contact position different from that shown for a time interval which is equal to the pulse length. The pulse has been released as a result of a rising boundary layer in the upper gradient lock.

Figure 5:
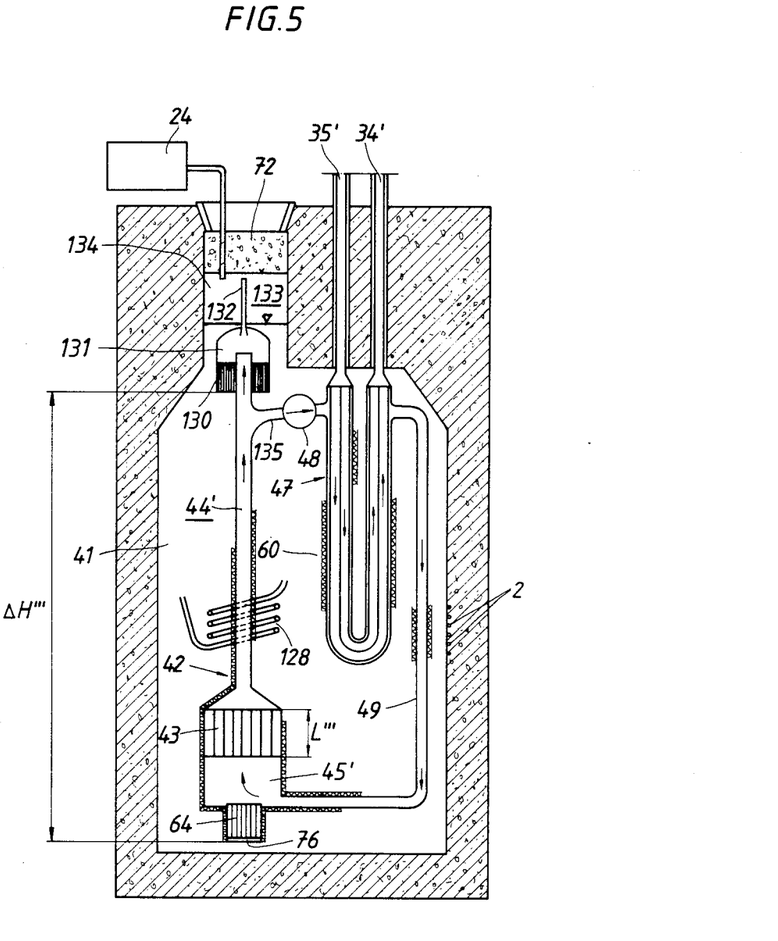

In the embodiment of the reactor plant shown in FIG. 5, the outlet chamber 44' of the reactor vessel 42 comprises a bell-shaped member 131 which is arranged in a coaxial relation with, and attached to, the uppermost end of a tubular portion of the outlet chamber. The bell-shaped member 131 surrounds an annular gradient lock 130. As in the case of the gradient lock 63 shown in FIG. 4, two vertically spaced-apart transducers (not shown), for example thermocouples, are arranged in the gradient lock 130. These transducers are included in a regulating system in the same way as the transducers 69 and 70 shown in FIG. 4. The upper end of the bell-shaped member 131 is provided with a through-going pipe 132. During normal reactor operation, the mid-portion of the gradient lock 130 has a boundary layer between strongly borated pool water and weakly borated or pure reactor cooling water, the reactor cooling water filling the portion of the member 131 located above the boundary layer, and the pipe 132. As in the previously described embodiments, the pool is provided at the top with a narrow, substantially circular-cylindrical throat 133. In normal operation of the reactor plant there is a gas cushion 134 in the upper part of the throat 133, which is in communication with a steam boiler 24. The upper end of the tube 132 opens into the gas cushion 134. The outlet chamber 44' is connected to a heat exchanger in the form of a steam generator element 47 via an outlet tube 135, which is welded to the outlet chamber 44' below the upper gradient lock 130. In FIG. 5, the items designated by the numerals 2, 34', 35', 60 and 128 are the same as the corresponding designated items in FIG. 1, the items designated by the numerals 41, 43, 45', 48, 49 and 72 are the same as the correspondingly designated items in FIG. 3, and the items designated by the numerals 64 and 76 are the same as the correspondingly designated items in FIG. 4.

Figure 6:
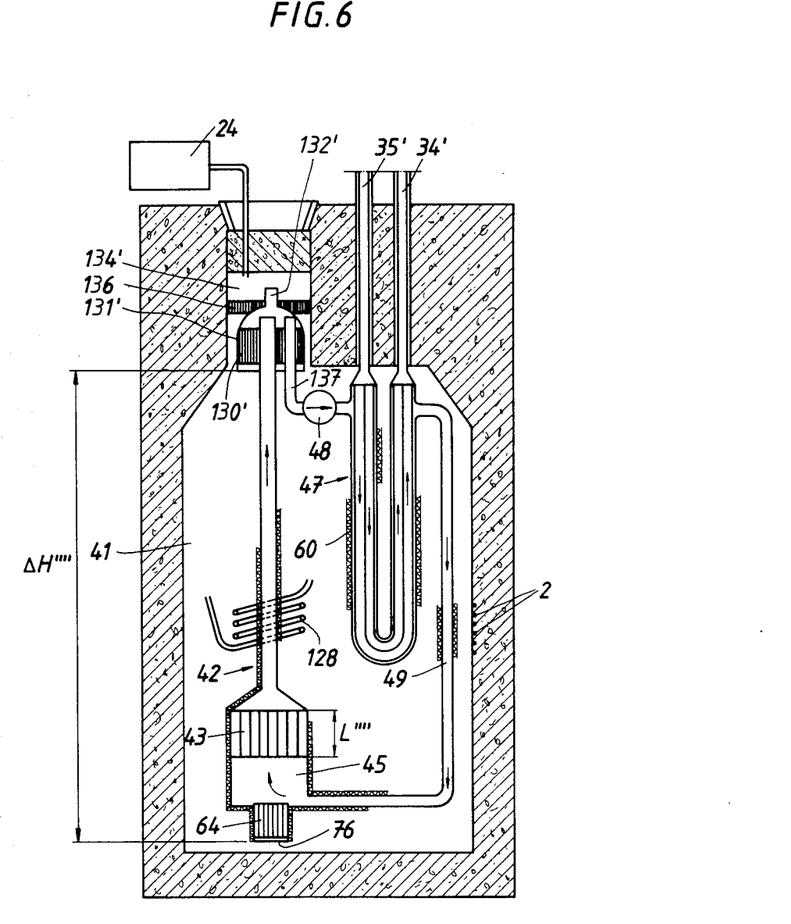

The reactor plant shown in FIG. 6 has an upper gradient lock 130', corresponding to the gradient lock 130 shown in FIG. 5, and a bell-shaped body 131', corresponding to the bell-shaped body 131. The body 131' communicates via a pipe 132' with a gas cushion 134'. The portion of the body 131' located above the gradient lock 130' and the body 132' are, during normal operation of the reactor, filled with reactor cooling water. The boundary surface between the gas cushion 134' and the pool liquid lies in an extra gradient lock 136 which is arranged above the gradient lock 130'. The boundary layer between pool liquid and reactor cooling water lies in the mid-portion of the gradient lock 130'. An outlet conduit 137 opens out into the body 131' above the gradient lock 130'. In FIG. 6 the items designated by the numerals 2, 24, 34', 35', 60 and 128 are the same as the correspondingly designated items in FIG. 1, the items designated by the numerals 41, 42, 43, 45', 47, 48 and 49 are the same as the correspondingly designated items in FIG. 3, and the items designated by the numerals 64 and 76 are the same as the correspondingly designated items in FIG. 4.

Although not shown in FIGS. 1, 3, 5 and 6, the reactor plants of these Figures are, of course, provided with an automatic control system for maintaining the reactor temperature at the desired value, which control system may be constructed in the same way as the control system described with reference to FIG. 4.

The vertical distance, designated ΔH, ΔH', ΔH", ΔH''' and ΔH'''' in FIGS. 1, 3, 4, 5 and 6, respectively, between the upper shutdown opening and the lower shutdown opening is, in all cases, at least seven times, and preferably at least eight times, the vertical dimension L, L', L", L''' and L'''', respectively, of the respective reactor core.

In all cases, the steam boiler or other pressurizer 24 may be replaced by an electric heating element which is arranged in the pool liquid in the upper, throat portion of the pool.

The coolers 128 shown in FIGS. 1, 4, 5 and 6 are only shown to suggest their cooling function. In practice they would be disposed in the uppermost portion of the pool, as shown in FIG. 3, in order to avoid emptying of the pool in the case of leakage. The reactor plants of FIGS. 1, 4, 5 and 6 may also be provided with an auxiliary pump having the same purpose as the pump 57 shown in FIG. 3.

Preferably, several heat exchangers should be disposed in corresponding pockets in the "ceiling" of the pool body, each heat exchanger comprising a plurality of vertical cooling tubes. In that case each group of cooling tubes may advantageously be surrounded by a substantially hollow-cylindrical body and provided with an electrically driven pump, by means of which pool liquid is driven along the cooling tubes.

Indication of a boundary layer between the pool liquid and the reactor water is—in the control equipment described above—carried out by means of a level indicator comprising a number of transducers in the form of thermoelements, thus taking advantage of the fact that the reactor water and the pool liquid are different as regards temperatures. However, since the two liquids are also different as regards other physical properties, it is possible to use transducers for these properties instead of the transducers described, for example transducers for electric resistivity, or transducers for refractive index.

It is also possible to use a level indicator comprising a vertical resistance element arranged with its midpoint in the region of the normal boundary layer. The electrical resistance of this element indicates the height of the boundary layer. For example, the minimum resistance occurs when the element is totally surrounded by cold liquid.

I claim:

1. In a nuclear reactor plant of the type including a pool filled with a neutron-absorbing pool liquid; a reactor vessel within the pool and enclosing a water filled reactor core provided with cooling channels, the reactor vessel including an inlet chamber communicating with the pool liquid via a lower shutdown opening and an outlet chamber communicating with the pool liquid via an upper shutdown opening, a vertical distance being measured between the lower and upper shutdown openings; heat exchange means; outlet means connecting said heat exchange means and said outlet chamber; inlet means connecting said inlet chamber to said heat exchange means; a circulating pump in the primary circuit of the reactor for providing, during normal operation of the reactor, a substantially constant flow of reactor cooling water through the core; a heat insulating layer covering most of the total pool liquid-facing surface of reactor components belonging to said primary circuit and disposed in said pool; the reactor core, in addition to being included in the primary circuit of the reactor plant, being included in a shutdown circuit which comprises the inlet chamber, the lower shutdown opening, the pool, the upper shutdown opening and the outlet chamber, the shutdown circuit having an inherent flow-driving tendency which, when cooling water flows through the reactor core, causes an inherent pressure difference to prevail in the shutdown circuit, the inherent pressure difference being counteracted and balanced by the pressure drop prevailing across the reactor core due to the flow therethrough of reactor cooling water, so that no significant supply of pool liquid to the primary circuit takes place, the improvement comprising:

said reactor vessel being filled during normal operation with cooling water which extends along a portion greater than one half the length of said vertical distance;

pool cooler means disposed in said pool for cooling said pool liquid to a temperature at least 50 degrees Celsius lower than the temperature of said cooling water flowing from said outlet chamber and said pool liquid and said cooling water extending respectively, within said pool and said reactor vessel to levels sufficiently above said reactor core so that a first static pressure exerted by a theoretical column of cooling water extending inside said reactor vessel and having a height which is equal to said vertical distance is lower than a second static pressure exerted by a theoretical column of pool liquid of the same height as said theoretical column of cooling water, the difference between said second static pressure and said first static pressure being more than 60% of said pressure drop prevailing across said reactor core.

2. The improvement according to claim 1, wherein said pool cooler means comprises an inlet pipe and a return pipe for a cooling fluid, a greater part of the total cooling surface of said pool cooler means being arranged in contact with said pool liquid, said inlet pipe and said return pipe being connected to a heat-receiving system arranged outside said pool.

3. The improvement according to claim 1, wherein said vertical distance is at least seven times the vertical dimension of said core.

4. The improvement according to claim 1, wherein all the portions of said inlet means and said outlet means located in said pool are arranged above the upper edge of said reactor core and at a distance therefrom which constitutes at least 20% of the maximum liquid depth of said pool.

5. The improvement according to claim 1, wherein said lower shutdown opening is provided with a gradient lock comprising a plurality of vertical channels, and with a gas lock device with a supply pipe for gas from outside said pool.

6. The improvement according to claim 1, wherein said circulating pump is arranged to be driven by a driving system having a control circuit for controlling its speed, said control circuit of said driving system being connected, via signal transmission means to a level indicator arranged at said lower shutdown opening for indicating the position of a boundary layer between said cooling water and said pool liquid, said level indicator being arranged to give a first signal at a high position of said boundary layer and to give a second signal at a relatively lower position of said boundary layer, whereby said first signal gives an increase of the speed of rotation of the circulating pump, whereas said second signal gives a reduction of this speed.

7. The improvement according to claim 1, wherein a level indicator is arranged at said upper shutdown opening for indicating the position of a boundary layer between said reactor cooling water and said pool liquid, said level indicator being arranged to give a signal at a high position of said boundary layer, said reactor plant further comprising:

a first control pipe for adding cooling water to said primary system;

a valve device for said first control pipe;

a second control pipe having an inlet opening in the vicinity of said lower shutdown opening;

a third control pipe having an inlet opening for said pool liquid in the upper part of said pool;

a first remotely controllable outflow valve in said second control pipe;

a second remotely controllable outflow valve in said third control pipe; and relay means for interlocking said first outflow valve with said valve device at a first relay position and interlocking said second outflow valve with said valve device at a second relay position, in such a manner that the ingoing flow of cooling water through said first control pipe is equal to the outgoing flow of pool liquid through said second or third control pipe, said relay means being arranged to assume said second relay position in response to said signal.

8. A reactor plant according to claim 2, wherein at least one of said shutdown openings is provided with a gradient lock comprising a plurality of vertical channels arranged adjacent each other, the pool liquid present in the pool and the cooling water present in the reactor vessel during normal reactor operation exhibiting a measurable mutual difference as regards a certain physical property; and an upper transducer and a lower transducer for said property are arranged at a mutual vertical distance from each other in said gradient lock.

9. A nuclear reactor plant of the type including a pool filled with a neutron-absorbing pool liquid; a reactor vessel within the pool and enclosing a water-filled reactor core provided with cooling channels, the reactor vessel including an inlet chamber communicating with the pool liquid via a lower shutdown opening and an outlet chamber communicating with the pool liquid via an upper shutdown opening, a vertical distance being measured between the lower and upper shutdown openings; heat exchange means; outlet means connecting the heat exchange means and the outlet chamber; inlet means connecting the inlet chamber and the heat exchange means; a circulating pump in the primary circuit of the reactor for providing, during normal operation of the reactor, a substantially constant flow of reactor cooling water through the core; a heat insulating layer covering most of the total pool liquid-facing surface of reactor components belonging to the primary circuit and disposed in the pool; the reactor core, in addition to being included in the primary circuit of the reactor plant, being included in a shutdown circuit which comprises the inlet chamber, the lower shutdown opening, the pool, the upper shutdown opening and the outlet chamber, the shutdown circuit having an inherent flow-driving tendency which, when cooling water flows through the reactor core, causes a pressure difference to prevail in the shutdown circuit, the pressure difference being counteracted and balanced by the pressure drop prevailing across the reactor core due to the flow therethrough of reactor cooling water, so that no significant supply of pool liquid to the primary circuit takes place, the improvement comprising:

pool cooler means disposed in said pool for cooling said pool liquid to a temperature at least 50 degrees Celsius lower than the temperature of said cooling water flowing from said outlet chamber; and in addition to said circulating pump, a liquid jet pump which during normal reactor operation is arranged to operate in said shutdown circuit and to provide part of said pressure difference prevailing in said shutdown circuit whereby during abnormal reactor operation said jet pump draws pool liquid into said reactor vessel.

10. A reactor plant according to claim 9, further comprising means for interlocking said liquid pump with said circulating pump so that an increase or reduction of the pressure difference generated by said circulating pump results in a corresponding increase or reduction of the pressure difference generated by said liquid pump.

11. A reactor plant according to claim 9, wherein said liquid pump is a water jet pump, in which the water jet receives cooling water flow driven by said circulating pump without delivering any flow of liquid from said pool.

12. The improvement according to claim 9, wherein said pool cooler means comprises an inlet pipe and a return pipe for a cooling fluid, a greater part of the total cooling surface of said pool cooler means being arranged in contact with said pool liquid, said inlet pipe and said return pipe being connected to a heat-receiving system arranged outside said pool.

* * * * *